United States Patent [19]
Pond

[11] 4,105,336
[45] Aug. 8, 1978

[54] ELECTRO-OPTICAL DEVICE FOR USE IN IMPROVED INTERFEROMETERS

[76] Inventor: Charles Ray Pond, 2630 S. 288th, Federal Way, Wash. 98003

[21] Appl. No.: 690,034

[22] Filed: May 25, 1976

[51] Int. Cl.² ............................................. G02B 9/02
[52] U.S. Cl. .................................. 356/113; 350/172; 350/174
[58] Field of Search ................... 350/169, 172, 174; 356/106 R, 110, 113

[56] References Cited

U.S. PATENT DOCUMENTS

| 3,601,490 | 8/1971 | Erickson | 356/106 R |
| 3,825,348 | 7/1974 | Nomarski et al. | 356/113 X |

Primary Examiner—John K. Corbin
Assistant Examiner—Matthew W. Koren

[57] ABSTRACT

A device for use in an interferometer, and the combination thereof, the device itself combining the functions of filter, beam combiner, and modulator. In structure, the device includes a relatively small glass plate, which has deposited on opposite faces thereof two extremely small elliptical mirrors which each function as a reflecting spatial filter. In the improved interferometer which includes such a device, reference and signal beams are produced from a single coherent source. The signal beam is spatially filtered by the mirrors and directed to a target. The returning signal beam, reflected from the target, is combined with the reference beam by the mirrors to form a composite beam which forms interference patterns, from which can then be extracted, with extremely high resolution, information concerning the physical characteristics of the target.

17 Claims, 5 Drawing Figures

ELECTRO-OPTICAL DEVICE FOR USE IN IMPROVED INTERFEROMETERS

BACKGROUND OF THE INVENTION

The present invention relates generally to that portion of the useful arts concerned with the phenomenon of interference produced by superposition of coherent light beams, and more specifically concerns the class of instruments known in the art as interferometers.

An interferometer is an instrument that utilizes known principles of light interference phenomenon for the purpose of measuring, with a very high degree of resolution, certain physical phenomenon, such as coefficients of expansion of materials, light wave lengths and the expansion or contraction of structures due to stress or thermal distortion. Interferometers are particularly useful in those circumstances where measurement of such quantities requires a resolution capability as great as $10^{-6}$ inches.

A typical application in which the interferometer of the present invention has been used is in the measurement of thermal distortion of the Large Space Telescope (LST) metering truss for simulated space thermal/vacuum conditions. The truss is a 6.5 meter long, 3.4 meter diameter cylindrical truss structure designed to hold the primary and secondary mirrors of a 3 meter aperture space telescope in alignment. In operation, the LST metering truss must maintain the mirror alignment within relatively close tolerances, even when temperatures on the supporting structure may vary up to several hundred degrees on different surfaces thereof.

In such an application, the physical effect of such temperature differences on the expansion and contraction of the supporting structure must be precisely known so that the supporting structure can be correctly designed, including the proper choice of materials. The interferometer of the present invention possesses the resolution capability necessary for such use.

Another typical use of interferometers is in dilatometry, i.e. measurement of the coefficient of thermal expansion of low expansion composite structural elements. The high resolution capability of interferometers in general, and in particular the interferometer of the present invention, permits the engineer to precisely determine the effect of thermal distortion of various structures during the engineering design phase of the structure, and thus avoid significant structural problems which might otherwise be encountered in actual use.

A relatively recent development in the art of interferometers has been the multichannel interferometer, which, in a single unit, has the capability of simultaneously performing expansion measurements with respect to several different locations on a target structure. This is accomplished by splitting the signal beam into a predetermined number of sub-signal beams, such as by means of an apertured plate. Each one of the sub-signal beams is directed by a sequence of reflecting surfaces and focusing lenses to a desired location on the target, and then reflected back therefrom as a returning sub-signal beam. Each of the returning sub-signal beams is then combined with a corresponding reference beam to form a plurality of composite beams, from each of which may be extracted, by known methods, accurate information concerning the thermal distortion of the target.

FIG. 1 shows a relatively simple multi-channel interferometer. A laser source 11 generates a beam of coherent light which is then spatially filtered at 12 by the combination of objective lens 13 and a pinhole element 15. The pinhole typically has a diameter of approximately 25 microns. Following spatial filtering at 12, the beam spreads until it reaches collimating lens 16, which acts to collimate the beam into a 2 inch diameter beam, prior to it reaching beam splitter 17.

Beam splitter 17 divides the collimated beam from lens 16 into a signal beam 19 and a reference beam 21, with the signal beam and the reference beam being split at right angles to each other, their relative intensities being equal. Signal beam 19 is directed through an apertured screen 22, thereby dividing the signal beam 19 into a desired number of sub-signal beams. The sub-signal beams are reflected off reflecting surface 23 on to a series of pointing mirrors, referred to as a group at 25. From pointing mirrors 25, the sub-signal beams are then directed through a window element 27 to the desired locations on the target. The sub-signal beams are then reflected back from the target by known reflector means (not shown) along their respective incident paths back to beam splitter 17.

Reference beam 21 meanwhile is directed through an apertured screen 29, similar to apertured screen 22, from which emerges a set of sub-reference beams which are focused by lens 31 on a vibrating mirror assembly 33, which phase modulates the sub-reference beams. The phase-modulated sub-reference beams are reflected from the mirror assembly 33 back to beam splitter 17, where they combine with the returning sub-signal beams, through known principles of superposition, to form composite information beams, which are then individually detected by conventional light detection means (not shown). The detectors operate in a known manner to extract information from the composite information beams concerning differences in signal path length of each of the sub-signal beams, due to thermal expansion of those portions of the target containing the desired locations.

Although the interferometer shown in FIG. 1 and discussed briefly above is relatively simple, it has been found that even the more complex multi-channel interferometers use similar filtering and combining techniques and, hence, share with the embodiment of FIG. 1 several significant operational disadvantages.

One significant problem with prior art interferometers concerns the fixed intensity ratio of the signal and reference beams, as formed from the source beam by beam splitter 17. Although particular beam splitters may be obtained which produce signal and reference beams having intensity ratios other than 1:1, the ratio is fixed for a particular beam splitter, and hence, is not adjustable. In many cases, it is desirable that the intensity ratio between the signal and reference beams be conveniently adjustable, without substitution of the beam splitter. Substitution of such portions of interferometers is both difficult and time-consuming, due to the necessary precise alignment of the optical elements for proper operation. Thus, as a practical measure, such an interferometer has a fixed intensity ratio between its signal and reference beams once it is initially constructed, aligned, and operating.

In addition, the actual efficiency and accuracy of prior art interferometers are frequently well below their theoretical capability. This is done purposefully, since if such an interferometer were to be aligned to perform to its maximum capability, light would be reflected back into the laser light source. The laser is an oscillator, so even a low level of light feedback can cause severe power fluctuations.

In order to minimize the reflection of light back into the source, the optical alignment of the interferometer system is somewhat detuned, thereby decreasing the efficiency of the interferometer, and also significantly decreasing its resolution capability. The detuning is accomplished in several ways. One example concerns the spatial filter. Referring to FIG. 1, the configuration of spatial filter 12 is not optimized in accordance with known optical principles, since far too much light would be reflected back into laser source 11 from pinhole element 15 if the pinhole were made the optimum size for best filtering.

Additionally, significant portions of the returning reference beam from mirror assembly 33, and the returning signal beam from the target, are transmitted back into source 11 by action of beam splitter 17 when the system is precisely turned, thereby resulting in undesirable power fluctuations in the source 11. In order to minimize this problem, the returning reference beam is somewhat defocused to reduce feedback to a tolerable level. This defocusing of the reference beam, however, results in a corresponding distortion of the wave fronts of the reference beam, and not only reduces the power efficiency of the instrument, but also results in a significant decrease of resolution capability.

Another significant problem with prior art multichannel interferometers, such as shown generally in FIG. 1, is wave front misalignment between returning signal and reference beams at beam splitter 17, due to phase errors introduced into the wave fronts of the reference wave by environmental changes. The reference wave in FIG. 1, following its creation at beam splitter 17, must traverse several optical elements and a significant amount of atmosphere before it combines with the returning signal beam from the target. Slight changes in the environmental conditions of the atmosphere, such as changes in humidity, barometric pressure and/or temperature, will result in recognizable phase errors in the reference wave, which phase errors will be interpreted by the detectors as a difference in path length for the signal beam. This will further result in erroneous information concerning thermal distortion of the target.

All of these problems combine to substantially reduce the efficiency, the resolution capability, and perhaps most importantly, the accuracy, of the interferometer, and thereby preclude its use in many applications for which it may otherwise be well suited.

Accordingly, it is a general object of the present invention to overcome one or more of the specific disadvantages of the prior art discussed above.

Another object of the present invention is to provide an interferometer which eliminates or substantially reduces light feedback into the source.

A further object of the present invention is to provide an interferometer having an increased power efficiency.

Another object of the present invention is to provide an interferometer having an adjustable intensity ratio between signal and reference beams.

Yet another object of the present invention is to provide an interferometer having improved control over the relative alignment of the signal beam and reference beam wave fronts.

A further object of the present invention is to provide an interferometer in which modulation of the reference wave is accomplished by a low voltage drive signal.

It is a still further object of the present invention to provide an interferometer which eliminates or substantially reduces phase errors in the reference beam wave fronts introduced by the environment and/or optical elements in the interferometer.

It is another object of the present invention to provide a single device which combines the functions of spatial filtering, beam combiner and reference beam modulator in an interferometer.

Other and further objects, features and advantages of the present invention will become apparent as the description proceeds.

SUMMARY OF THE INVENTION

Accordingly, the present invention includes a device which is useful in an interferometer, as well as the improved interferometer produced thereby. In an interferometer, a reference beam and an incident signal beam are produced by a common source. The incident signal beam is directed to a target and reflected therefrom, the reflected signal beam being defined as a returning signal beam. The reference beam then combines with the returning signal beam to form a composite beam, from which composite beam useful information concerning the target may be extracted by known means. The device itself comprises a plate-like means made from light-transmitting material, and supporting means which positions the plate-like means in a predetermined relationship to the reference beam, the incident signal beam and the returning signal beams. Hence, all of these beams are incident on the plate-like means at specified angles. The device further includes first and second reflecting means which are positioned on opposite faces of the plate-like means at specified locations relative to those locations where the reference beam, and the incident and returning signal beams are incident such that at least a portion of said reference beam combines with at least a portion of said returning signal beam to form the composite beam, and further, such that the remainders of the reference beam and the returning signal beam are both so directed so as to be substantially prevented from being transmitted back into the source.

DESCRIPTION OF THE DRAWINGS

A more thorough understanding of the invention may be obtained by a study of the following detailed description taken in connection with the accompanying drawings in which.

DESCRIPTION OF THE PREFERRED EMBODIMENT

Figure 2:
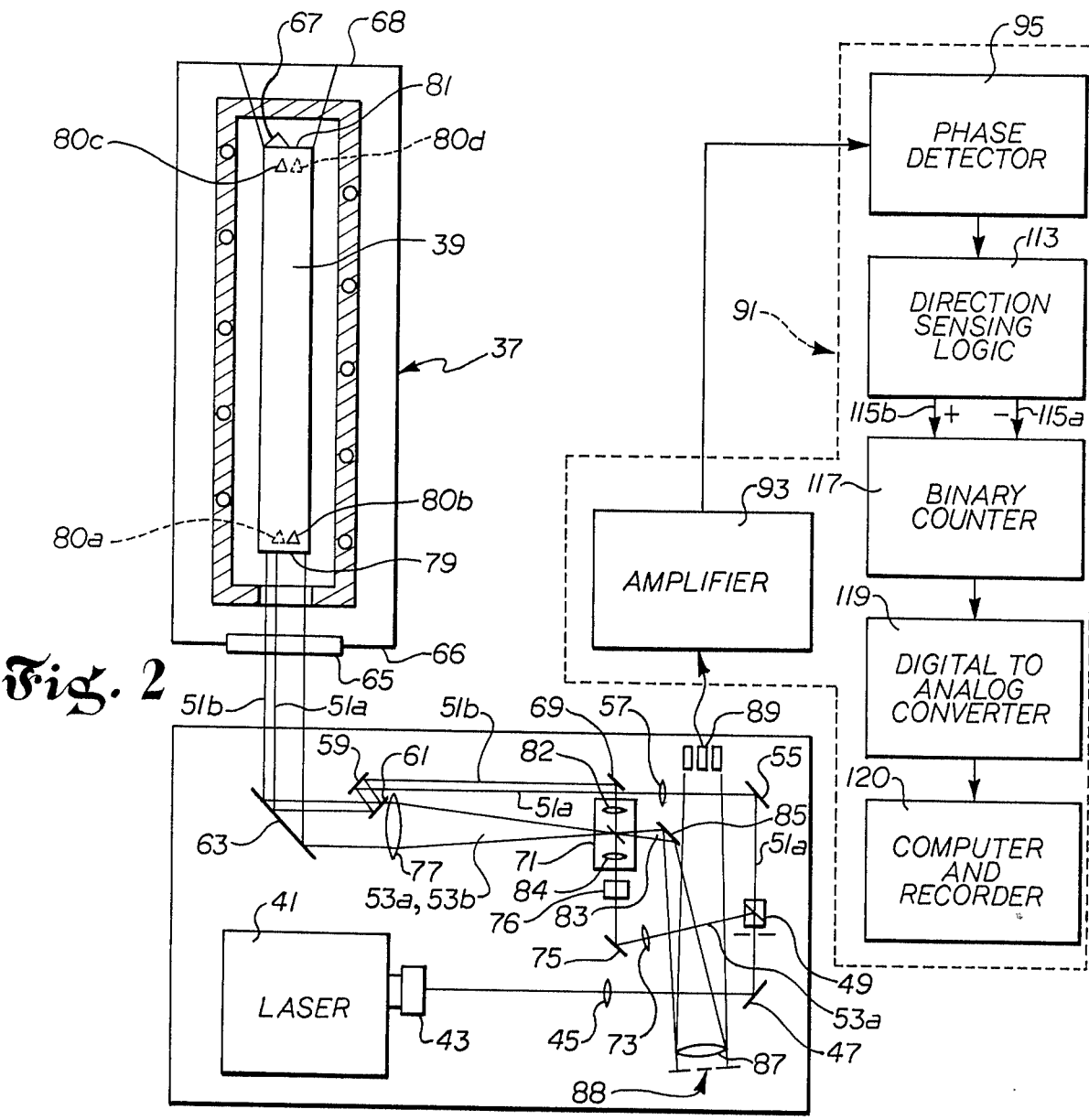
FIG. 2 is a combined element and block diagram showing an interferometer of the present invention arranged to perform the functions of a dilatometer.

Referring now to FIG. 2, an interferometer utilizing the principles of the present invention is arranged to function as a dilatometer for the purpose of measuring thermal expansion coefficients of particular materials. Thus, FIG. 2 includes an environmental chamber 37, in which is positioned a test specimen 39. This is a somewhat different target arrangement than that used for thermal distortion measurements on large structures designed for spaceborn application.

When the interferometer is arranged as a dilatometer, the reference beam is directed and reflected from a particular location on the test specimen, to determine the relative movement between test specimen and the interferometer itself. It should be understood, however, that the particular use to which the interferometer may be applied, such as dilatometry, as shown in FIG. 2, or for measurement of thermal distortion of structures, is not particularly relevant for the purposes of the present invention, although particular applications are explained in the specification for the purpose of clarification of the theoretical operation of the interferometer. Hence, those structural or operational modifications to the basic interferometer which are necessary in a particular useful application should not be considered to limit the scope of the invention.

Referring now specifically to the structure of the interferometer of the present invention, shown in FIG. 2, a laser source 41 of known manufacture generates a coherent source beam which is polarized at a known angle. Source 41 may be, for instance, a stabilized helium-neon laser, emitting a single light frequency having a wave length of 632.8 nanometers.

The polarized source beam is applied to a polarization rotator 43. A polarization rotator is a device of known construction which functions to alter, in controllable fashion, the polarization angle of a light beam applied at its input. The beam produced by polarization rotator 43 will be referred to as an altered source beam, since it is polarized at an angle specified by the operator, which may be different than the angle of polarization of the original source beam. The altered source beam is transmitted to lens 45, which aids in forming the altered source beam into a desired diameter. The beam diameter is chosen so that the spatial filtering efficiency, described later, exceeds 80%. The altered source beam is then reflected off reflecting surface 47, which is placed at a 45° angle to the altered source beam, to polarizing prism 49, which functions to divide the altered source beam incident thereon into its constituent horizontal and vertical components, the horizontal component being transmitted through polarizing prism 49 and referred to as incident reference beam 51a, while the vertical component is reflected from polarizing prism 49 and is referred to as incident signal beam 53a.

The combination of polarization rotator 43 and polarizing prism 49 permits the ratio of the power intensities of the incident reference and signal beams to be conveniently adjusted by the operator without substituting elements or realigning any of the structural protions of the interferometer. By changing the polarization angle of the light in the source beam, polarization rotator 43 makes it possible for polarizing prism 49 to produce component beams, i.e., incident reference beam 51a and incident signal beam 53a, having an intensity ratio which may be varied in a controlled manner.

Tracing now the optical path for incident reference beam 51a for the interferometer of FIG. 2, incident reference beam 51a, after transmission through polarizing prism 49, is reflected off reflecting surface 55 at a 45° angle to lens 57 which aids in maintaining incident reference beam 51a at a desired diameter. Incident reference beam 51a is transmitted through lens 57, then reflected off closely spaced reflecting surfaces 59 and 61, and then off folding mirror 63. From folding mirror 63, incident reference beam 51a travels through window 65 in the near end 66 of environmental chamber 37, proceeds substantially the length of chamber 37 alongside specimen 39, and is retro-reflected by retro-reflector 67 positioned at the far end 81 of specimen 39.

The retro-reflected, or returning reference beam 51b will, by virtue of the arrangement of the retro-reflector 67, be slightly offset from the incident reference beam 51a, and will describe a parallel, but slightly removed, path relative to the path of the incident reference beam 51a along the length of environmental chamber 37 and back out through window 65 at near end 66 thereof.

Figure 4:
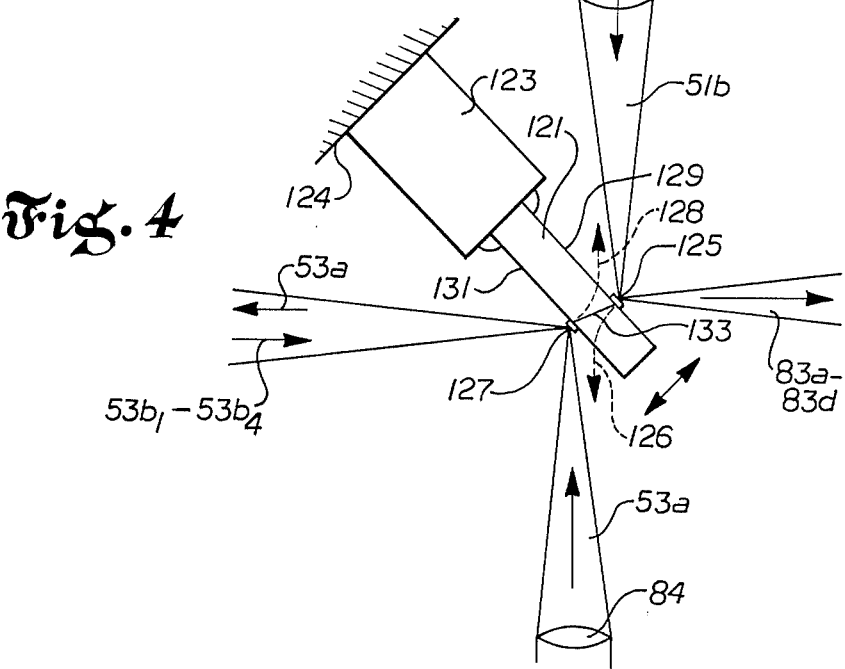
FIG. 4 is a diagram which shows in detail the optical device in the structure of FIG. 2 which combines the functions of spatial filter, beam combiner and modulator.

Returning reference beam 51b is then reflected by folding mirror 63, spaced reflecting surfaces 59 and 61, and reflecting surface 69, from which it proceeds into the combined spatial filter, beam combiner, and modulator structure shown in block form in FIG. 2 as element 71, and in more detail in FIG. 4. For purposes of convenience, the structure of block 71, which combines the functions of spatial filter, beam combiner, and modulator, will be referred to as the FCM element 71.

Tracing now incident signal beam 53a, it proceeds from polarizing prism 49 through lens 73, which, like lenses 45 and 57, aids in maintaining incident beams to a desired diameter. Following lens 73 is reflecting surface 75, which is oriented with respect to incident signal beam 53a so as to reflect it into FCM element 71. From reflecting surface 75, incident signal beam 53a is transmitted to a half-wave plate 76, which changes the vertical polarization of incident signal beam 53a to a horizontal polarization, so that the signal beam, upon its return from the target may be properly combined with the horizontally polarized returning reference beam in FCM element 71.

Figure 1:
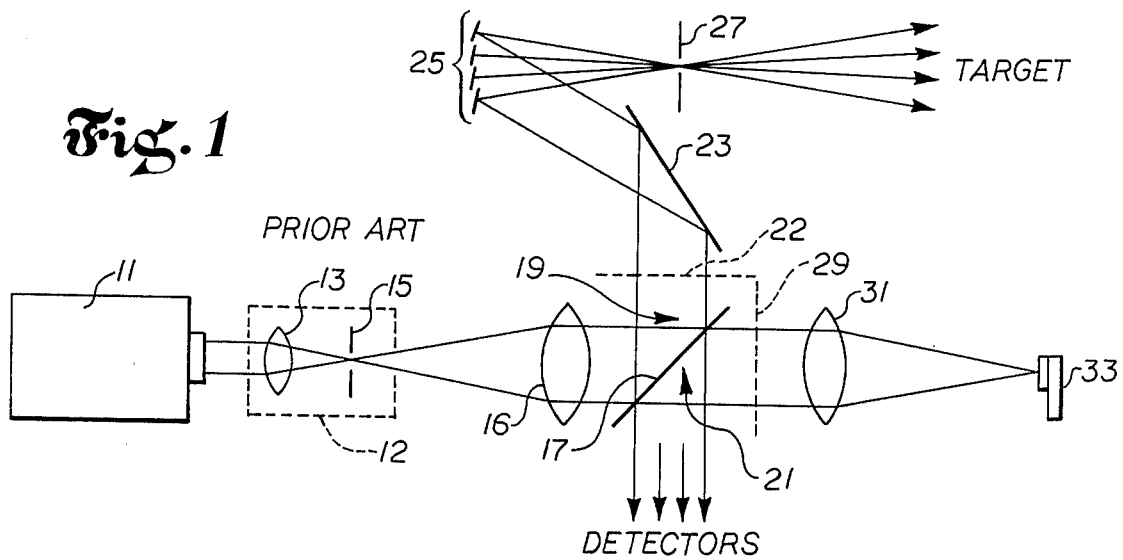
FIG. 1 is a simplified diagram of a multi-channel interferometer known in the prior art.

In FCM element 71, incident signal beam 53a is spatially filtered, as will be explained in detail with respect to FIG. 4, and then is reflected out of FCM element 71 to collimating lens 77. In one embodiment of the present invention, lens 77 has a 25.4 cm focal length, and collimates the beam size to a 5 cm diameter. The beam transmitted from lens 77, which is still referred to as incident signal beam 53a, is then reflected off reflecting surface 63 and through window 65 in the near end 66 of environmental chamber 37. Although incident signal beam 53a is still a single beam at this point, it should be remembered that a set of sub-signal beams could easily be produced by an apertured screen or similar device, as shown in FIG. 1.

In the embodiment of the invention shown in FIG. 2, incident signal beam 53a strikes reflectors 80a – 80d mounted on specimen 39. Reflectors 80a, 80b are positioned approximately 180° apart near the near end 79 of specimen 39, and the other two reflectors 80c, 80d are positioned approximately 180° apart near the far end 81 of specimen 39. The first pair of reflectors 80a, 80b are positioned orthogonally on specimen 39 with respect to the other pair of reflectors 80c, 80d.

Reflectors 80a – 80d are preferably what are known in the art as cube corner reflectors. A cube corner reflector is essentially the corner of a cube, with the face of the reflector opposite from the corner being planar. The planar face of the reflector is presented so as to reflect the incident signal beam back along its incident path, even though the angle of incidence between the incident signal beam and the planar face may vary considerably. In this embodiment, the planar face, or aperture, of the cube corner reflectors, is 3 mm.

Upon reflection by the respective cube corner reflectors, the signal beam (now returning signal beam 53b, which actually is four returning signal beams) travels back out through window 65, is reflected by reflecting surface 63, and focused by lens 77 into FCM element 71.

The returning signal beam 53b which is focused into FCM element 71 by lens 77 is then combined with returning reference beam 51b in FCM element 71 to produce a composite beam 83, which is the result of the superposition of returning reference beam 51b and returning signal beam 53b. Composite beam 83 in FIG. 2 comprises four beam portions, each portion being the superposition of one of the returning signal beams and the returning reference beam. The manner in which returning signal and reference beams 51b and 53b are combined to form composite beam 83 will be explained in detail in connection with FIG. 4.

Composite beam 83 is reflected off reflecting surface 85 through focusing lens 87 to a mirror array 88. Each mirror of mirror array 88 reflects one of the beam portions of composite beam 83 to a selected one of a series of detectors, such as that labeled 89. The number of detectors present in an interferometer depends on the number of beam portions in composite beam 83 to be detected. In the example of FIG. 2, four detectors are necessary, although only three are shown.

Each beam portion of the composite beam, and hence, each detector, will then have its own signal processing equipment which is shown generally at 91 with respect to detector 89 in FIG. 2. Signal processing equipment 91 takes the output from its associated detector (e.g., detector 89), amplifies the detected signal and then analyzes the composite signal to provide information of desired resolution concerning changes in the path length of the signal beam and changes in the direction of such change in path length. From this information, thermal coefficients of expansion and the dynamic response of a particular structure to thermal or other stress may be accurately determined.

The signal processing equipment shown as 91 in FIG. 2 is known in the art, and has been previously used by the assignee of the present invention in connection with other interferometers. A detailed explanation of the operation of the signal processing equipment 91 can be found in the article entitled "Multiple Channel Interferometer for Metrology," by C. R. Pond, M. H. Horman and P. D. Texeira, in the publication titled *Applied Optics,* Volume 10, No. 9, page 2144, September 1971.

Briefly, however, the signal from detector 89 is applied to a standard amplifier 93, the output of which is applied as an input to phase detector 95, which functions to synchronously demodulate the output from amplifier 93 at both (1) the frequency of modulation F; and (2) twice the frequency of modulation 2F.

Figure 3A:
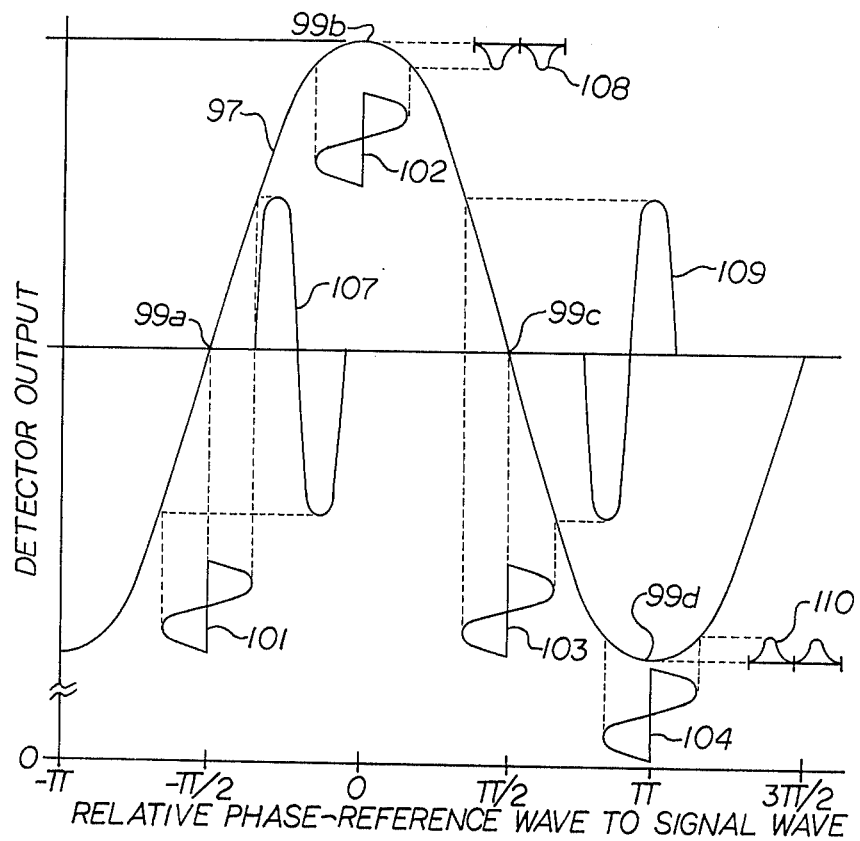
FIG. 3a is a signal diagram relating the output, in terms of light intensity, of a representative detector of the interferometer to the phase difference between signal and reference beams when they are combined to form the composite information beam, and further shows the effect on said detector output at specified cycle points thereof of modulation of the reference beam.

The returning reference beam is modulated at a particular frequency, e.g. 13.5 kilocycles, to permit accurate and unequivocal knowledge of the direction of, as well as the magnitude of, the thermal distortion of the target. The manner in which such information is obtained is as follows. Referring now to FIG. 3a, the large sine wave, denoted by the numeral 97, which is plotted as a function of the intensity of the light incident on detector 89 against the phase relationship between the reference beam and the signal beam, represents the output of detector 89 when the reference beam is unmodulated.

The intensity of the light incident on the detector 89 will thus vary as a sine wave in accordance with the distance of the signal beam path. As the path length of the signal beam changes, the phase relationship between the reference beam and the signal beam when combined changes accordingly, resulting in a pattern of change in the detector output voltage or current in the form of a sine wave. Sine wave 97 does not provide complete information, however, since there is no indication of the direction in which the signal path length is changing, and hence, no indication of whether the specimen or structure undergoing test is expanding or contracting.

In order to obtain this information, and thus provide complete information concerning the expansion and/or contraction of a specimen due to thermal distortion, the reference beam is phase modulated. The manner in which this modulation is actually obtained will be explained in further detail with respect to FIG. 4. When the reference wave is phase modulated, the output of the detector is affected in such a manner that the direction of change in signal path length may be unequivocally ascertained.

When the reference beam is phase modulated, the output of the detector will vary over time in accordance with the modulation, even when the time-average phase relationship between the signal and reference beams remains the same. Hence, the detector output will vary in intesity both (1) in responce to phase differences between the signal beam and the reference beam and hence, differences in the signal path length of the signal beam over a given period of time; and (2) in response to variation in the phasing of successive wave fronts of the reference beam over time, due to modulation of the reference beam.

The resulting modulated detector output is shown for four specific points 99a – 99d on sine wave 97, each point being 90° apart and covering in total 360°, or one complete cycle of phase relationship. The actual modulation signal component at each sinewave point 99a – 99d is shown on vertical axes as modulation waveforms 101, 102, 103, and 104, each such waveform being shown as a variation of amplitude against time.

The effect of modulation waveforms 101–104 on the intensity output of the detector 89 over time for each sine wave location 99a – 99d is shown as modulated waveforms 107, 108, 109, and 110. As an example, (FIG. 3a) modulated waveform 107 is the output of detector 89, showing intensity amplitude against time for the one phase relationship between the signal and reference beams of $-\pi/2$, when the reference beam has been modulated by modulation waveform 101. The intensity amplitude versus time representations for the other sine wave locations 99b – 99d are shown by modulated waveforms 108–110.

An inspection of modulated waveforms 107–110 shows that waveforms 107 and 109 are the same frequency (F) but 180° out of phase, while waveforms 108 and 110 also have the same frequency but twice that (2F) of waveforms 107 and 109, with waveforms 108 and 110 being 180° out of phase with each other. The important result obtained by the modulation of the reference beam is that a recognizable and unambiguous pattern develops concerning the phase and frequency of waveforms 107–110 at the phase quadrature sine wave locations 99a – 99b.

Figure 3B:
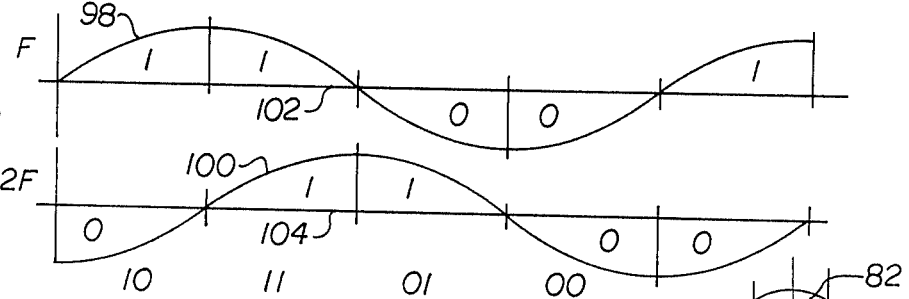
FIG. 3b are signal diagrams of the interferometer detector output, after synchronous phase detection thereof at both the modulation frequency (F) and twice the modulation frequency (2F).

The modulated output from detector 89 is synchronously demodulated at both the modulation frequency (F) and twice the modulation frequency (2F). The signal waveforms resulting from the synchronous demodulation are shown in FIG. 3b. Each cycle in both the F waveform 98 and the 2F waveform 100 is divided into 90° segments, with each 90° segment or quadrant which is positive, i.e. above reference lines 102 and 104, being assigned a binary one and each quadrant which is negative, i.e. below the reference lines, being assigned a binary zero. The binary notation for both waveforms 98 and 100 for each quadrant are then combined to form a binary identifier for each quadrant. Successive quadrants will thus have particular binary identifiers which will vary in a recognizable pattern as the intensity of the detector output varies over a complete cycle.

By comparing the immediate binary identifier with the stored binary identifier of the previous quadrant, and in turn comparing the pattern change of the binary identifier with a model pattern, direction sensing logic circuit 113 (FIG. 2) can determine whether the phase relationship between the signal beam and the reference beam is changing in a positive or negative direction, and hence can determine whether the signal path of the signal beam is increasing or decreasing.

Direction sensing logic circuit 113 has two outputs 115a and 115b. As circuit 113 recognizes that the phase relationship between the reference beam and the signal beam has changed to the extent of a quadrant (meaning a new binary identifier) a pulse is generated on one of the output lines, depending on whether the phase relationship is changing positively or negatively, which is determined through comparison of the present and immediate past binary identifier with a model pattern of change.

Assume, for example, that the detector output is at location 99b of sine wave 97 in FIG. 3a. As the signal path increases within a one-quarter wave length, the phase relationship between the signal and reference beams changes positively correspondingly, and the binary identifier 01 will be recognized. If the signal path length continues to increase into the next quadrant, the binary identifier 00 will be recognized, and a single pulse will appear on line 115b for each quadrant change.

If, on the other hand, the binary identifier 11 is recognized following recognition of 01, then this is an unambiguous indication that the signal path length is decreasing and hence, a pulse is produced on line 115a.

The pulses on lines 115a and 115b are then applied to a conventional binary counter 117, which functions to count the number of pulses from each output of the direction sensing logic circuit 113. Each pulse from circuit 113 represents a transition of one quadrant in the phase relationship between the signal beam and the reference beam. Since the wave length of the signal and reference beams is known, and since a quadrant's transition corresponds to a one-quarter wave length change in phase relationship, each pulse output represents a correspondingly known distance in signal path change.

This binary information representative of distance and direction is then translated into a numerical quantity by the digital to analog converter 119, the output of which is then applied to computer and recorder equipment 120, which uses the information from D/A converter 119 for follow-on processing and/or immediate display and recording.

Referring now to FIG. 4, FCM element 71 shown generally at 71 in FIG. 2 is shown in close-up detail. FCM element 71 comprises, in the preferred embodiment, a square glass plate 121 approximately 1.5 millimeters square and 0.2 millimeters thick.

Glass plate 121 is positioned relative to the beams incident thereon such that, considering the angle of incidence $\theta$ and the refraction index N of glass plate 121:

$$\theta \simeq \theta_B = \tan^{-1} N,$$

where $\theta_B$ is an angle well known in the art as Brewster's angle, i.e. that angle wherein the glass/air boundary has a reflection coefficient of zero for light polarized in the plane of incidence.

Glass plate 121 is mounted on the end of a conventional piezoelectric bender element 123. Piezoelectric bender element 123 is mounted in a known manner on a stable support element 124. With the use of a low voltage drive (not shown) on the order of 2 volts, piezoelectric bender element 123 produces mechanical phase modulation of the composite beam by means of vibration of glass plate 121 at the frequency of the drive voltage, so that the detected signal may be processed by equipment 91 as explained above.

Two elliptical mirrors 125 and 127 on the order of 7 × 10 microns in the embodiment shown and described are deposited on opposite faces 129 and 131, respectively, of glass plate 121. Mirrors 125 and 127 are deposited using known microcircuit fabrication techniques, and no novelty is asserted in the technique of deposition itself.

Mirrors 125 and 127 function as the reflection analog of a pinhole spatial filter similar to that of filter 12 in FIG. 1. Where the spatial filtering performed on the source beam of FIG. 1 for the purpose of producing a smooth intensity distribution is accomplished by transmitting the central portion of the focused source beam, while reflecting, and hence not using, the remainder, mirrors 125 and 127 in FIG. 4 spatially filter the beams incident thereon by reflecting a sufficiently small portion of the focal region of each wave front so that the wave fronts of the reflected portion have a substantially smooth intensity distribution, while the remainder of the incident beam is transmitted through glass plate 121. Mirrors 125 and 127 are termed the "reflection analog" of a pinhole spatial filter since the reflected portion of an incident beam is used, and the transmitted portion disgarded.

Mirrors 125 and 127 are, furthermore, slightly offset from each other on opposite faces 129 and 131 of glass plate 121, so that those portions of the signal and reference beams which are transmitted through glass plate 121 are sufficiently misaligned to prevent light feedback into laser source 41 (FIG. 2).

Referring now to both FIGS. 2 and 4, returning reference beam 51b is reflected off reflecting surface 69 and proceeds through focusing lens 82 to impinge on and around mirror 125. Mirror 125 functions to spatially filter reference beam 51b, with the reflected portion thereof being filtered, while the remaining portion thereof is transmitted through glass plate 121 along dotted line path 126.

Since mirrors 125 and 127 are offset, the transmitted portion of reference beam 51b following dotted line path 126 will not be directed back along the path of incident signal beam 53a and hence will not be reflected back into laser 41. Thus, returning reference beam 51b does not have to be defocused, and may thus be utilized in accordance with theoretical guidelines, significantly increasing the efficiency and resolution capability of the interferometer.

Furthermore, since returning reference beam 51b is spatially filtered virtually at the point of its being combined with the returning signal beam, the impact of environmental variables, such as temperature, humidity, and barometric pressure, and other errors introduced by optical elements and extended path lengths, are eliminated. Hence, another potential source for phase errors in the reference beam wave front, and hence, error in final measurement information, is eliminated or significantly reduced by the structure of the present invention.

Referring again to FIGS. 2 and 4, incident signal beam 53a is first focused by lens 84 onto and around mirror 127, which functions to spatially filter incident signal beam 53a in a manner similar to that of mirror 125 with respect to returning reference beam 51b.

The reflected portion of incident signal beam 53a proceeds outward from FCM element 71 in the direction of collimating lens 77 (FIG. 2). The remainder of incident signal beam 53a is transmitted through glass plate 121 along dotted line path 128. Dotted line path 128 is not directed back along the path of reference beam 51b, which leads back to source 41, because mirror 127 is offset from mirror 125. Thus, the portion of incident signal beam 53a which is transmitted through glass plate 121 does not follow a path coincident with the reference beam path, and hence is not reflected back into laser source 41. This offsetting of mirrors 125 and 127 thus eliminates direct feedback into the laser and permits the interferometer to operate at its maximum efficiency and resolution.

As disclosed above, and shown in FIG. 2, incident signal beam 53a proceeds through several optical elements into environmental chamber 37, and is reflected back from the reflectors on speciment 39, at which point it can more correctly be termed returning signal beam 53b. The returning signal beam 53b consists of four, 3mm diameter signal beams $53b_{1-4}$, one from each retroreflector 80a–80d. The returning signal beams $53b_{1-4}$ are reflected by folding mirror 63 back through lens 77, which focuses returning signal beams $53b_{1-4}$ onto and around mirror 127.

In accordance with well-known principles of diffraction theory, the full width W of the central portion of the diffraction pattern of a beam at the focal point of a lens having a focal length f, in the case where the lens is illuminated by a uniform collimated beam of wave length λ and diameter $d$ is found by the following formula:

$$W = 2.44 f\lambda/d$$

Using a lens 77 with a 25.4 cm focal length, the 3mm diameter returning signal beams $53b_1$–$53b_4$ will each have a focal width of approximately 130 microns at face 131, which is, or course, substantially larger than the size or mirror 127. A very small portion (approximately 1% in the embodiment shown and described) of the returning signal beam 53b is reflected by mirror 127 while the remainder thereof is transmitted through glass plate 121 along solid line path 133, whereupon reaching mirror 125, it combines with the reflected portion of returning reference beam 51b to form composite beam 83, which comprises four beam portions 83a–83d, each beam portion being the result of superposition of one of the returning signal beams $53b_1$–$53b_4$ and returning reference beam 51b, which, referring to FIG. 2 is then applied to signal processing equipment 91 for extraction of the desired information therefrom.

The physical arrangement of FCM element 71 shown in detail in FIG. 4 results in several significant advantages over prior art interferometers, principal among them being very substantial reduction of beam reflection back into the laser source, the elimination of wave front phase errors due to premature spatial filtering of the reference beam, and elimination of wave front misalignment between signal and reference beams. Wave front alignment between signal and reference beams is assured in the arrangement of the present invention, since the portion of returning reference beam 51b which is reflected for the purpose of combining with the transmitted portion of returning signal beam 53b is introduced precisely at the center of the transmitted portion of returning signal beam 53b.

Thus, a device is provided which, in the form of a single unit, combines the functions of spatial filter, beam combiner, and modulator, for use in high resolution interferometers. Such a structure permits an interferometer to be used to its full theoretical resolution capability, substantially eliminating sources of beam reflection back into the laser source and insuring precise alignment of the reference and signal beams. This insures that the fringe patterns developed by superimposing the returning reference beam 51b with the returning signal beam 53b is a result of differences of signal path length of the signal beam alone and is not due to extraneous environmental factors.

Although an exemplary embodiment of the invention has been disclosed here for purposes of illustration, it will be understood that various changes, modifications and substitutions may be incorporated in such embodiment without departing from the spirit of the invention as defined by the claims which follow.

What is claimed is:

1. A device for use in an interferometer, in which said interferometer an incident signal beam and an incident reference beam are produced by a common source, wherein in operation of the interferometer, the incident signal beam is directed to a target and then reflected therefrom as a returning signal beam and the incident reference beam is transmitted to the target or reference element and reflected therefrom as a returning reference beam, said device comprising:
   a. plate-like means of light transmitting material;
   b. means supporting said plate-like means in an operative position in the interferometer, in which position the incident signal beam and the returning signal beam are incident on one exterior face of said plate-like means, and the returning reference beam is incident on the opposite exterior face of said plate-like means; and
   c. first and second reflecting means positioned on the opposite exterior faces of said plate-like means in such a manner relative to each other and having such a configuration relative to the size of the areas on said plate-like means over which the incident signal beam, the returning signal beam, and returning reference beam are incident, that (1) when the incident signal beam is substantially centered on said first reflecting means, a substantial portion of the incident signal beam is reflected by said first reflecting means for subsequent transmission to the target, and (2) that when said returning signal beam is substantially centered on said first reflecting means and said returning reference beam is substantially centered on said second reflecting means, a substantial portion of said returning reference beam is reflected from the second reflecting means and combines with a substantial portion of said returning signal beam which is transmitted through said plate-like means, thereby forming a composite beam from which useful information concerning the target may be extracted, the remainders of said incident signal beam and said returning reference beam being so directed as to be substantially prevented from returning to the common source in the interferometer.

2. An apparatus of claim 1, wherein said first and second reflecting means are so configured, relative to the size of the areas over which the incident signal beam and returning reference beam are incident on the operatively positioned plate-like means, that the reflected portions of the incident signal beam and the returning reference beam incident thereon have a substantially smooth intensity distribution, each reflecting means thus functioning substantially as a spatial filter for the incident signal beam and the returning reference beam, and further, dividing the incident signal beam and the returning reference beam into a reflected portion and a transmitted portion, wherein the reflected portion of said incident signal beam is a spatially-filtered incident signal beam, and the transmitted portion thereof is directed through said plate-like means in such a direction as to be substantially prevented from being transmitted back into the common source, and wherein the reflected portion of the returning reference beam is a spatially-filtered returning reference beam which combines with the returning signal beam to form the composite beam.

3. An apparatus of claim 2, wherein said platelike means and said reflective means are so configured and arranged that when said device is operatively positioned in the interferometer, the angle of incidence of the incident signal beam, the returning signal beam and the returning reference beam is Brewster's angle.

4. An apparatus of claim 1, wherein said device includes means for modulating the composite beam.

5. An apparatus of claim 4, wherein said modulating means includes means for vibrating said plate-like means at a predetermined frequency.

6. An apparatus of claim 5, wherein said first and second reflecting means are mirrors formed by deposition on said opposite exterior faces of said plate-like means.

7. An apparatus of claim 6, wherein said mirrors are the reflection analog of a pinhole spatial filter.

8. An apparatus of claim 7, wherein said mirrors are approximately 7 microns by 10 microns in surface dimensions.

9. An interferometer, comprising:
a. a source of a coherent light beam;
b. means dividing the light beam generated by said source into an incident signal beam and an incident reference beam;
c. means directing the incident signal beam to a target, the incident signal being reflected from the target as a returning signal beam in the operation of said interferometer;
d. second means directing the incident reference beam to the target or reference element, the incident reference beam being reflected from the target as a returning reference beam in the operation of the interferometer;
e. means combining the returning signal beam with the returning reference beam to form a composite beam, wherein said combining means further comprises:
plate-like means of light transmitting material;
means supporting said plate-like means in an operative position in said interferometer, in which position the incident signal beam and the returning signal beam are incident on one exterior face of said plate-like means, and the returning reference beam is incident on the opposite exterior face of said plate-like means; and
first and second reflecting means positioned on the opposite exterior faces of said plate-like means in such a manner relative to each other and having such a configuration relative to the size of the areas on said plate-like means over which the incident signal beam, the returning signal beam, and returning reference beam are incident; that (1) when the incident signal beam is substantially centered on said first reflecting means, a substantial portion of the incident signal beam is reflected by said first reflecting means for transmission to the target by said first directing means, and (2) that when said returning signal beam is substantially centered on said first reflecting means and said returning reference beam is substantially centered on said second reflecting means, a substantial portion of said returning reference beam is reflected from the second reflecting means and combines with a substantial portion of said returning signal beam which is transmitted through said platelike means, thereby forming a composite beam, the remainders of said incident signal beam and said returning reference beam being so directed as to be substantially prevented from returning to said source in said interferometer; and
f. means detecting said composite beam, from which useful information may be obtained concerning the target.

10. An apparatus of claim 9, wherein said first and second reflecting means are so configured, relative to the size of the areas over which the incident signal beam and returning reference beam are incident on the operatively positioned plate-like means, that said first and second reflecting means function, respectively, as a spatial filter for the incident signal beam and the returning reference beam, dividing each of them into a reflected portion and a transmitted portion, such that the reflected portion of the incident signal beam, which is directed to the target, is a spatially-filtered incident signal beam, and such that the reflected portion of the returning reference beam is a spatially filtered returning reference beam, which combines with the returning signal beam to form the composite beam.

11. An apparatus of claim 10, wherein said platelike means and said reflective means are so configured and arranged that when said device is operatively positioned in the interferometer, the angle of incidence of the incident signal beam, the returning signal beam, and the returning reference beam is Brewster's angle.

12. An apparatus of claim 11, wherein said device includes means for modulating the composite beam.

13. An apparatus of claim 12, wherein said modulating means includes means for vibrating said plate-like means at a predetermined frequency.

14. An apparatus of claim 9, including means for analyzing said detected composite beam to obtain information concerning the quantity and direction of path length changes for the incident and returning signal beams.

15. An apparatus of claim 9, wherein said dividing means includes means for adjusting the ratio of the light intensities of said incident reference beam and said incident signal beam.

16. An apparatus of claim 15, wherein said source includes means producing coherent light at a known angle of polarization, and wherein said adjusting means includes means for controllably altering said known angle of polarization.

17. An apparatus of claim 16, wherein said adjusting means further includes means for obtaining the horizontal and vertical components of said coherent light beam, the horizontal component being horizontally polarized and being directed in the interferometer as the reference beam, and the vertical component being vertically polarized and being directed in the interferometer as the incident signal beam, the apparatus further including means to change said vertically polarized incident signal beam to a horizontally polarized incident signal beam.

* * * * *

UNITED STATES PATENT AND TRADEMARK OFFICE
CERTIFICATE OF CORRECTION

PATENT NO. : 4,105,336
DATED : August 8, 1978
INVENTOR(S) : Charles Ray Pond

It is certified that error appears in the above—identified patent and that said Letters Patent are hereby corrected as shown below:

Assignee: The Boeing Company, Seattle, Washington

Attorneys: Cole, Jensen & Puntigam P.S.

Signed and Sealed this

Thirty-first Day of July 1979

[SEAL]

Attest:

Attesting Officer

LUTRELLE F. PARKER
*Acting Commissioner of Patents and Trademarks*